US00RE47319E

(19) United States
(12) Reissued Patent
Phillips, III et al.

(10) Patent Number: US RE47,319 E
(45) Date of Reissued Patent: Mar. 26, 2019

(54) TOY AND HOBBY BUILDING BLOCKS ADHESIVE

(71) Applicant: Spill-Tech Laboratory, Inc., Dalton, GA (US)

(72) Inventors: Leon H. Phillips, III, Rocky Face, GA (US); Leon H. Phillips, Jr., Rocky Face, GA (US); Benny R. Wood, Rome, GA (US)

(73) Assignee: Spill-Tech Laboratory Co., Dalton, GA (US)

(21) Appl. No.: 15/833,275

(22) Filed: Dec. 6, 2017

Related U.S. Patent Documents

Reissue of:
(64) Patent No.: 9,624,407
Issued: Apr. 18, 2017
Appl. No.: 15/164,199
Filed: May 25, 2016

U.S. Applications:
(60) Provisional application No. 62/188,682, filed on Jul. 5, 2015.

(51) Int. Cl.
*C09J 103/02* (2006.01)
*A63H 33/14* (2006.01)
*A63H 33/08* (2006.01)

(52) U.S. Cl.
CPC ..... *C09J 103/02* (2013.01); *A63H 33/086* (2013.01); *A63H 33/14* (2013.01)

(58) Field of Classification Search
CPC ..... C09J 103/02
USPC ..... 156/328
See application file for complete search history.

(56) References Cited

U.S. PATENT DOCUMENTS 4,008,116 A * 2/1977 Sebel ..... C09J 129/04 156/328
4,059,555 A * 11/1977 Imai ..... C09J 113/02 524/549
5,641,349 A * 6/1997 Koubek ..... C08B 30/12 106/206.1
2010/0311299 A1* 12/2010 Rath ..... A63H 33/14 446/87

* cited by examiner

*Primary Examiner* — Timothy J. Kugel
(74) *Attorney, Agent, or Firm* — Dewitt Mackall Crounse & Moore; C. G. Mersereau

(57) ABSTRACT

A water soluble adhesive for use in assembling toy interlocking plastic building blocks is disclosed which add strength to assembled structures yet enables easy disassembly and reuse.

16 Claims, 5 Drawing Sheets

TOY AND HOBBY BUILDING BLOCKS ADHESIVE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCED TO RELATED APPLICATIONS

This application is a non-provisional application of Application No. 62/188,682, filed Jul. 5, 2015 and claims priority from that application which is also deemed incorporated by reference in its entirety in this application.

STATEMENT REGARDING FEDERALLY SPONSORED RESEARCH OR DEVELOPMENT

Not applicable

BACKGROUND OF THE INVENTION

I. Field of the Invention

The present invention relates to the leisure activity of building structures of many kinds using toy interlocking plastic building blocks that generally involves assembling a large number of small parts that fit together using frictional bonds which can readily be separated and the parts reused in other structures. More particularly, the invention relates to enhancing the structural strength of the bonds in such assembled structures in a manner that prevents undesirable separation of parts yet retains the desirable property that the structure can be disassembled and the parts reused. Specifically, the invention involves the provision of a water soluble adhesive that enhances the bonding strength yet can be completely removed without harming the building blocks.

II. Related Art

Children and adults that are involved in the activity of building structures, toys, models, vehicles and landscapes using toy interlocking building blocks are constantly faced with undesirable separation of the blocks. This occurs during the building process and through usage while playing with a built structure. Much aggravation results from spending tedious hours putting small parts together for a final product only to have portion or parts come apart too easily. The locking mechanisms of these building blocks are generally snap fit frictional bonds that have very limited strength.

An important aspect of using toy interlocking building blocks is that the structures can be readily disassembled and the blocks reused to construct other structures. Thus, it would be desirable if the strength of articles constructed from toy interlocking building blocks could be significantly enhanced without sacrificing the reusable aspect.

SUMMARY OF THE INVENTION

The shortcomings of constructing articles from toy interlocking building blocks, particularly plastic toy interlocking building blocks, is overcome by the provision of a [soluble] *water-soluble* and releasable adhesive that creates a stronger bond between two or more preferably plastic building blocks. The bond created by the adhesive of the invention can later be reversed or dissolved by immersing the adjoined parts in water which results in no damage to the building blocks. [On] *One* example of a usable adhesive matrix is made from a preferred formulation that is water based and characterized by ultra low volatile organic compound (VOC) emission and has no effect on the material of the toy building blocks.

The water-soluble adhesive is formulated for use with plastic toy building blocks or bricks, particularly those made from acrylonitrile butadiene styrene (ABS), such as those sold under the trademark Lego® and KRE-O®, Mega Blox®, Nano Blox®, Brictek® and American Blox. The adhesive material creates a strong non-permanent adhesive bond that remains until reuse of the building blocks or bricks is desired at which time the adhesive can be released by immersion of the glued parts in warm water. Any residue can also be removed in this manner.

A successful adhesive that has been found to be particularly suitable for use with ABS parts is as follows:

| | Wt% |
|---|---|
| Hydrolyzed Starch (selected from corn, soy bean, wheat, rice and/or potato) | 32-46% |
| Soluble Synthetic Polymer (preferably selected from polyacrylic acid, acrylic acid esters, polyvinyl acetates. polyvinyl alcohols and polyvinyl pyrrolidones) | 18-32% |
| Alkali and Viscosity Stabilizers (sodium or potassium hydroxide) | 0.05-015% |
| Antibacterial and Anti-fungal Additives; suitable antibacterial products are available from Ultra-Fresh and Fungitrol products are available from Troy Corporation | 0.40-1.2% |
| Water | 28-40% |
| Properties: | |
| Viscosity (range): | 25-40,000 cps |
| pH: | 6.5-7.4 |
| Solids: | 45-60% |
| Wt/gal | 9.1-10.4 lbs. |

DETAILED DESCRIPTION

The invention involves a water soluble adhesive that is particularly suited to improve the adhesion of toy building blocks or bricks put together in assembled structures. The adhesive of the invention is more specifically designed for use with acrylonitrile butadiene styrene (ABS) toy building block or brick material which is commonly used to create snap-together structures which can be disassembled and reassembled to create other structures.

*The main ingredients of the adhesive material are hydrolyzed starch and water-soluble synthetic polymers, along with an amount of water adjusted to give the desired solid specification. Varying minor amounts of other additives can be included. These include alkali and viscosity stabilizers, antibacterial and anti-fungal additives.*

Figure 1:
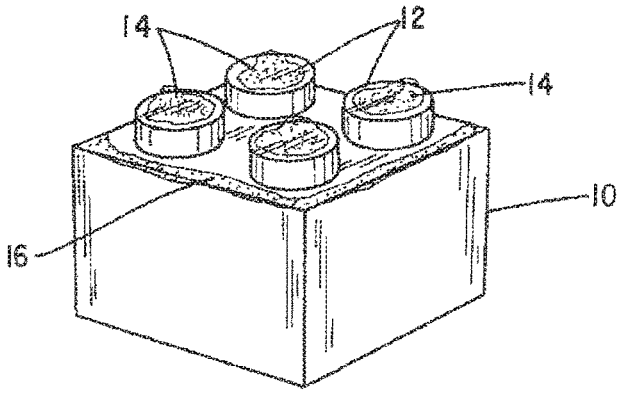
FIG. 1 depicts a greatly enlarged building block showing adhesive placed on assembly points.

FIG. 1 depicts a toy building block 10 with a plurality of snap-together fittings shown at 12 which are designed to fit into comparable recesses in the bottoms of other such building blocks. An amount of adhesive is shown applied to the tops of the fittings as at 14 and about the periphery of the top edge of the block 10 at 16.

Figure 2:
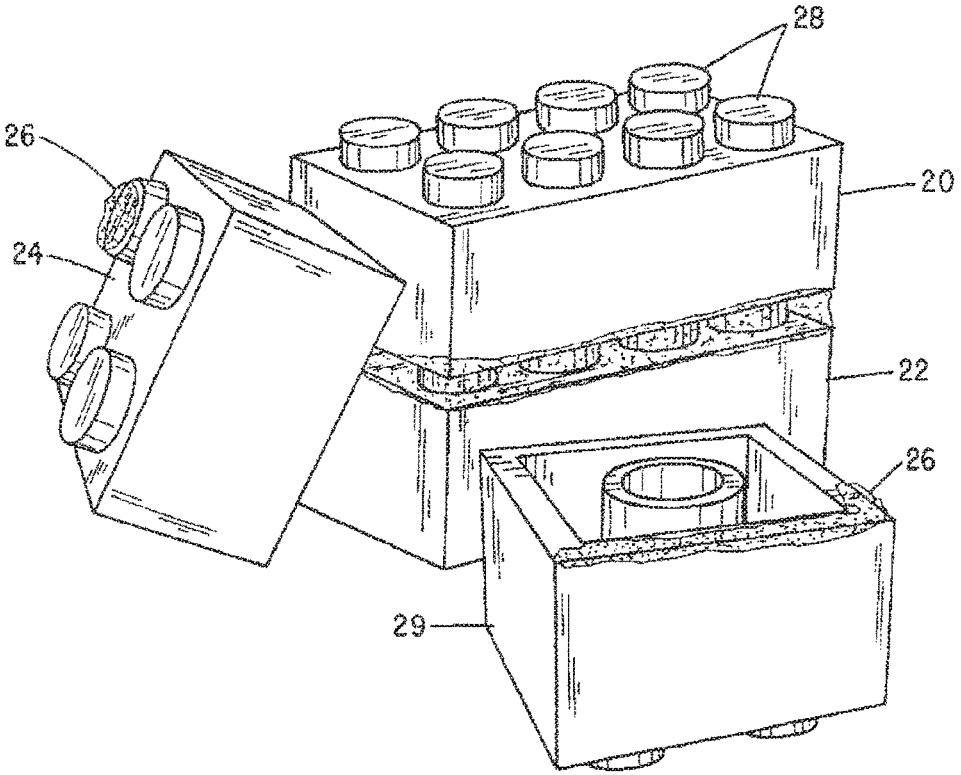
FIG. 2 shows adhesive placed between building blocks being snapped together.

FIG. 2 illustrates two assembled blocks 20 and 22 and a third block 24 with adhesive shown at 26. The assembled blocks have eight snap-together fittings as illustrated at 28 on block 20.

Figure 3:
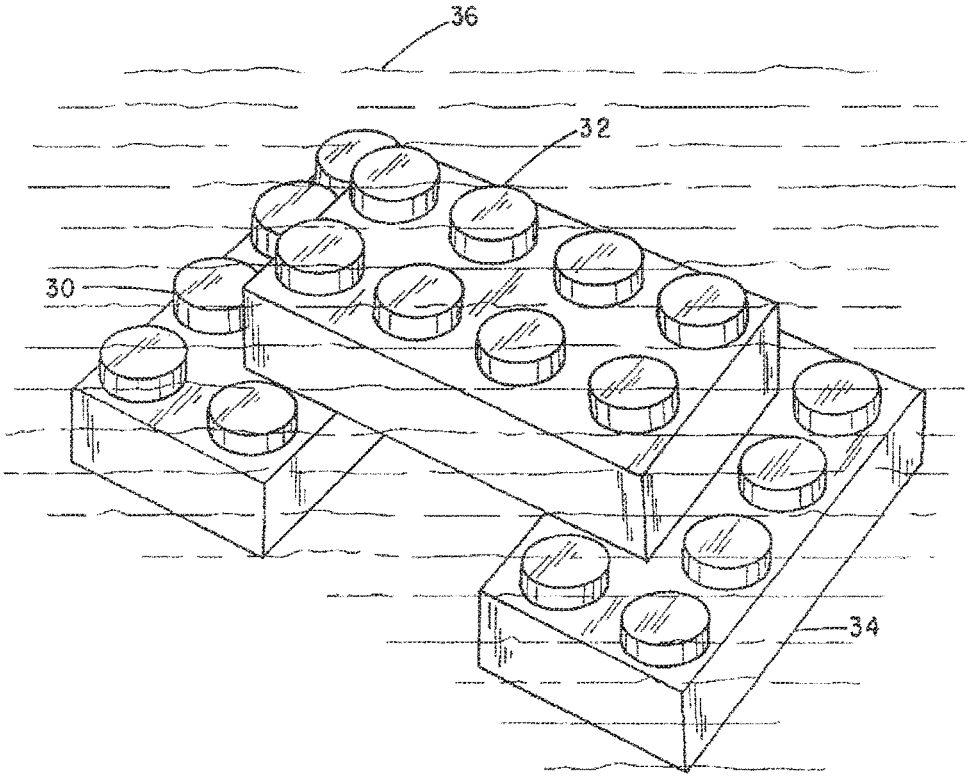
FIG. 3 illustrates an assembled combination being placed in water and immersed to dissolve the adhesive bond and release the building blocks for reuse.

FIG. 3 depicts an assembly of three blocks or bricks 30, 32 and 34 submerged in water 36 to release the adhesive. An advantage of the water-soluble adhesive of the invention lies in the fact that not only does water release the bond, but it also removes any residual amounts of adhesive left on the block or brick.

Figure 4:
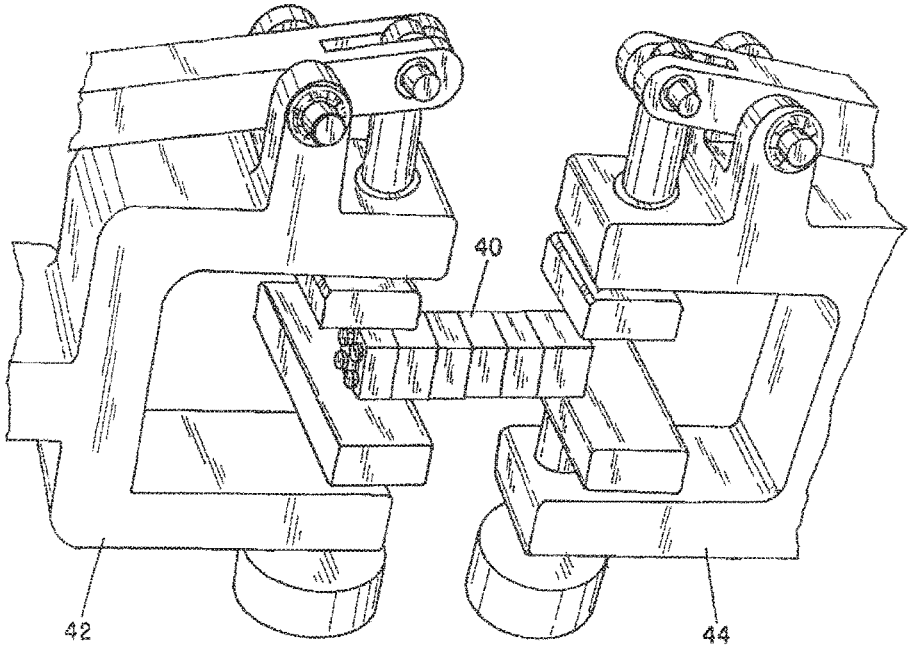
FIG. 4 depicts a device to test the bond strength of the adhesive in an assembled building block combination.

FIG. 4 shows an assembly of blocks or bricks 40 being subjected to a bond strength test clamped between spaced test devices, parts of which are shown at 42 and 44.

Figure 5:
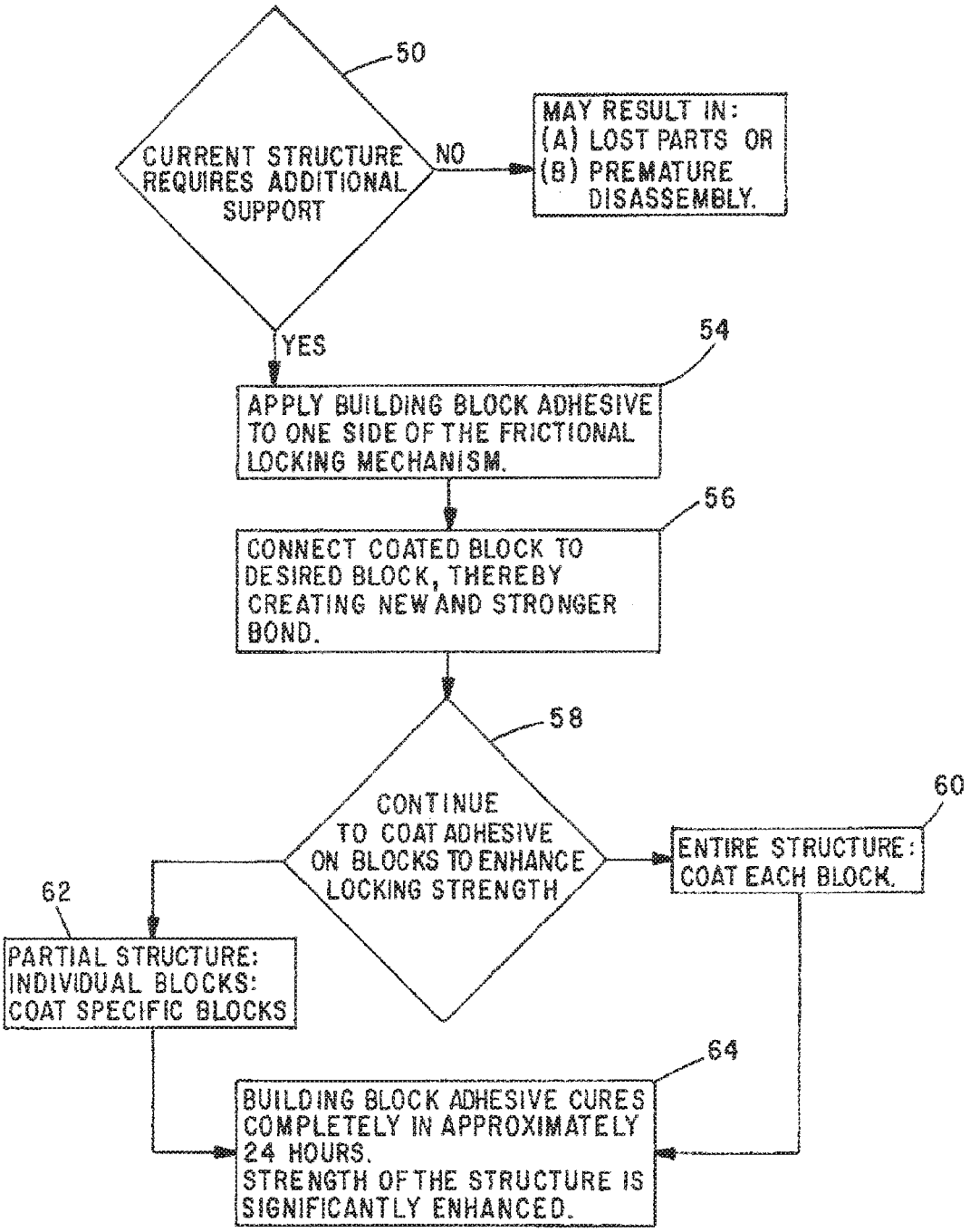
FIG. 5 is a flow chart showing an assembly process using the adhesive.

FIG. 5 depicts a flow chart of an assembly process beginning with a decision at 50 whether to add adhesive to structure to be built. Possible consequences of not using adhesive are shown at 52. Blocks 54 and 56 show the assembly of initial blocks as in FIG. 2. In 58, a decision cannot be made as to whether the entire structure should be assembled with adhesive at 60 or only selected parts of the structure as at 62. The structure is shown completed at 64.

Figure 6:
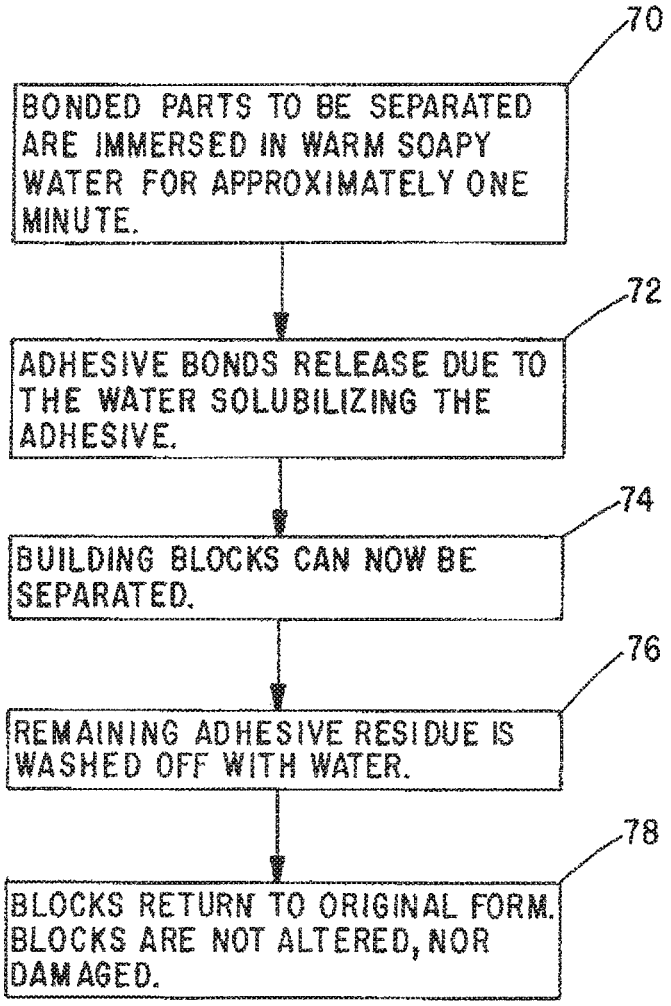
FIG. 6 is a flow chart showing disassembly steps.

FIG. 6 depicts a typical *example of a* disassembly process in which parts to be disassembled are immersed in a water solution of soap or detergent at 70. This releases the glue bonds at 72 and the parts are separated at 74. The remaining adhesive residue is washed off with water at 76. The blocks at 78 can then be reused in another structure as they are unaffected by the adhesive process.

A further alternative adhesive based on the above general formula follows:

| | Wt% |
|---|---|
| Hydrolyzed Starch (selected from corn, soy bean, wheat, and, combinations thereof) | 35-45% |
| Soluble Synthetic Polymer (selected from acrylic acid esters, Polyvinyl acetates, polyvinyl alcohols and combinations thereof) | 22-30% |
| Alkali and Viscosity Stabilizers (sodium or potassium hydroxide) | 0.05-0.12% |
| Antibacterial and Anti-fungal Additives; suitable antibacterial products available from Ultra-Fresh and Fungitrol products available from Troy Corporation | 0.45-1.05% |
| Water | adjusted for desired solid specification |
| Properties: | |
| Viscosity (range): | 25-40,000 cps |
| pH: | 6.5-7.4 |
| Solids: | 45-60% |
| Wt/dal | 9.1-10.4 lbs. |

The adhesive is not permanent and the bond created by its use can be easily reversed by immersion in warm water. By applying a small amount of adhesive to the top or bottom of a toy building block before attaching an adjoining building block, the bond between the blocks will be substantially enhanced so that the final structure will have a much lower propensity to come apart during playing or usage activities. Testing at a certified laboratory has confirmed the bond strength is enhanced and up to 10 times stronger than blocks adjoined without the use of this invention. It has been found that the bond or the enhanced strength of the bond can best be reduced or eliminated by the bonded parts being immersed in water that has a temperature of at least 100° F. Any residue from the usage of the adhesive is easily removed from the toy building blocks. The use of this adhesive has no effect on the integrity of the building blocks. The strength and structure of the plastic is not lessened, deformed, blistered, discolored, or detrimentally affected from the exposure to the adhesive. The bond is broken by reduction of the cohesive properties which are only topical in structure and are not marrying the molecules of the plastic block to the adhesive or each other. Thus, the ABS plastic is totally unaffected by the adhesives.

In addition, the antimicrobial and anti-fungal additives in the adhesive inhibit the growth of bacteria and fungi which may be responsible for unpleasant odors and staining of parts. They keep the adhesive hygienic and prolong the shelf life of the product.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. An adhesive material for use in structures of toy acrylonitrile butadiene styrene (ABS) blocks or bricks comprising:

| | | |
|---|---|---|
| a) | hydrolyzed starch | 32-46% |
| b) | soluble synthetic polymer | 18-32% |
| c) | alkali and viscosity stabilizers | 0.05-0.15% |
| d) | antibacterial and antifungal additives | 0.4-1.2% |
| e) | water | 28-40% |

2. An adhesive material as in claim 1 wherein the hydrolyzed starch is selected from the group consisting of corn, [soy bean] *soybean*, wheat, rice, potato and combinations thereof.

3. An adhesive material as in claim 1 wherein the soluble synthetic polymer is selected from the group consisting of polyacrylic acid, acrylic acid esters, polyvinyl acetates, polyvinyl alcohols and polyvinyl pyrrolidones.

4. An adhesive material as in claim 1 wherein the hydrolyzed starch is selected from corn, soybean, wheat and combinations thereof and wherein the soluble synthetic polymer is selected from the group consisting of acrylic acid esters, polyvinyl acetates, polyvinyl alcohols, and combinations thereof.

5. An adhesive material as in claim 1 wherein the alkali and viscosity stabilizers are selected from sodium and potassium hydroxide.

6. An adhesive material as in claim 4 wherein the alkali and viscosity stabilizers are selected from sodium and potassium hydroxide.

7. A method of assembling toy ABS blocks or similar polymer-based blocks or bricks designed to lock together comprising:

a) providing an amount of adhesive comprising *an amount of hydrolyzed starch, an amount of water-soluble synthetic polymer, and an amount of water adjusted for desired solid specification;*

| | | |
|---|---|---|
| [(1) | hydrolyzed startch | 32-46% |
| 2) | soluble synthetic polymer | 18-32% |
| 3) | alkali and viscosity stabilizers | 0.05-0.15% |
| 4) | antibacterial and antifungal additives | 0.4-1.2% |
| 5) | water | 28-40%] |

b) applying an amount of the adhesive of (a) to one side of a frictional locking mechanism of a block to be connected;

c) connecting coated block of (b) to a desired block to be connected;

d) repeat (c) until a structure is completed with as much of it as desired connected by the adhesive; and e) allowing the adhesive to cure.

8. A method as in claim 7 further comprising disassembling a structure connected by the adhesive by immersion in water, the blocks thereafter being reusable in another structure.

*9. A water-soluble adhesive material for use in structures of toy interlocking building blocks or bricks comprising an amount of hydrolyzed starch, an amount of water-soluble synthetic polymer, and an amount of water adjusted for desired solid specification, wherein the amount of hydrolyzed starch is in the range of about 32-46%, the amount of water-soluble synthetic polymer is in the range of about 18-32% and the amount of water is in the range of about 28-40% adjusted.*

*10. A water-soluble adhesive material as in claim 9 further comprising 0.05%-0.15% of alkali and viscosity stabilizers.*

*11. A water-soluble adhesive material as in claim 9 further comprising 0.4%-1.2% of antibacterial and antifungal additives.*

*12. An adhesive material as in claim 9 wherein the hydrolyzed starch is selected from the group consisting of corn, soybean, wheat, rice, potato and combinations thereof.*

*13. An adhesive material as in claim 9 wherein the soluble synthetic polymer is selected from the group consisting of polyacrylic acid, acrylic acid esters, polyvinyl acetates, polyvinyl alcohols and polyvinyl pyrrolidones.*

*14. An adhesive material as in claim 12 wherein the soluble synthetic polymer is selected from the group consisting of polyacrylic acid, acrylic acid esters, polyvinyl acetates, polyvinyl alcohols and polyvinyl pyrrolidones.*

*15. A water-soluble adhesive material as in claim 13 further comprising 0.05%-0.15% of alkali and 0.4%-1.2% viscosity stabilizers and 0.4%-1.2% antibacterial and antifungal additives.*

*16. An adhesive material as in claim 10 wherein the alkali and viscosity stabilizers are selected from sodium and potassium hydroxide.*

* * * * *